United States Patent
Myers et al.

[11] Patent Number: 5,826,331
[45] Date of Patent: Oct. 27, 1998

[54] METHOD FOR THE PRODUCTION OF A FRACTURE SPLIT CONNECTION COMPONENT

[75] Inventors: Martin R. Myers, Columbus; James W. Patten, Hope; Paul C. Becker, Bloomington; Terry M. McInerney, Columbus; Dennis P. Potter, Madison; James M. Short; Paul Biggerstaff, both of North Vernon; Robert Stevens, Columbus, all of Ind.

[73] Assignee: Cummins Engine Company, Inc., Columbus, Ind.

[21] Appl. No.: 760,574

[22] Filed: Dec. 4, 1996

Related U.S. Application Data

[63] Continuation-in-part of Ser. No. 472,773, Jun. 7, 1995, abandoned.

[51] Int. Cl.$^6$ ..................................................... B23P 15/00
[52] U.S. Cl. ........................................... 29/888.09; 29/411
[58] Field of Search ....................... 29/888.09, 411–417; 225/2; 74/579

[56] References Cited

U.S. PATENT DOCUMENTS

| | | |
|---|---|---|
| 3,818,577 | 6/1974 | Bailey et al. . |
| 3,978,566 | 9/1976 | Ladin . |
| 4,458,555 | 7/1984 | Holtzberg et al. ..................... 29/888.09 |
| 4,688,446 | 8/1987 | Iahikawa ............................... 29/888.09 |
| 4,836,044 | 6/1989 | Lobig ..................................... 29/888.09 |
| 4,860,419 | 8/1989 | Hekman ................................. 29/888.09 |
| 4,884,900 | 12/1989 | Pirault et al. . |
| 4,936,163 | 6/1990 | Hoag et al. . |
| 4,970,783 | 11/1990 | Olaniran et al. . |
| 4,993,134 | 2/1991 | Hoag et al. . |
| 5,109,605 | 5/1992 | Hoag et al. . |
| 5,131,577 | 7/1992 | Hoag et al. . |
| 5,135,587 | 8/1992 | Olaniran et al. . |
| 5,524,507 | 6/1996 | Olmr et al. ........................... 29/888.09 |

FOREIGN PATENT DOCUMENTS

| | | | |
|---|---|---|---|
| 0696688 | 2/1996 | European Pat. Off. ........ | F16C 33/64 |
| 3904020 | 8/1990 | Germany .......................... | B22F 7/06 |
| 6042525 | 2/1994 | Japan . | |
| 34210 | 8/1984 | Sweden .............................. | 29/888.09 |

OTHER PUBLICATIONS

SAE Technical Paper Series 930491, *Recent Developments in Materials and Processed for Automotive Connecting Rods* Rajeshwar K. Gupta, Mar. 1–5, 1993, pp. 1–8.

*Primary Examiner*—Irene Cuda
*Attorney, Agent, or Firm*—Sixbey, Friedman, Leedom & Ferguson; David S. Safran

[57] ABSTRACT

A method of manufacturing a component formed of parts capable of being separated for reassembly around another component. The process starts by taking separate, e.g., rod and cap, forgings and coining or forging them together prior to machining. The mating surfaces of the forgings are formed with a ridge-groove or a dimple/lug-recess configuration giving them a self-locating ability. After machining, the forgings are fractured along the original division to obtain two uniquely matched surfaces that need no further processing before being reassembled, e.g., to form a connecting rod for an internal combustion engine.

31 Claims, 2 Drawing Sheets

METHOD FOR THE PRODUCTION OF A FRACTURE SPLIT CONNECTION COMPONENT

CROSS-REFERENCE TO RELATED APPLICATION

The present application is a continuation-in-part of U.S. patent application Ser. No. 08/472,773, filed Jun. 7, 1995, abandoned.

BACKGROUND OF THE INVENTION

1. Field of the Invention

The invention is directed to a method for manufacturing of a fracture split connecting rod for internal combustion engines and other forged components which must be separated for reassembly around another component.

2. Description of Related Art

U.S. Pat. Nos. 4,936,163; 4,993,134; 5,109,605 and 5,131,577 to Hoag et al., assigned to Ford Motor Company, disclose a method for making connecting rods by fracturing a single machined and pre-stressed part. Similar methods for producing connecting rods by fracture splitting a single forged part are also described in the March, 1993, SAE Technical Paper No. 930491, "Recent Developments in Materials and Processes for Automotive Connecting Rods" by Rajeshwar K. Gupta, and in U.S. Pat. Nos. 4,884,900 (Pirault et al.), 4,970,783 and 5,135,587 (Olaniran et al.). The materials of the components formed using these fracture splitting techniques are relatively brittle, low ductility (toughness) materials, such as powder forgings, cast iron, etc.

As is described in U.S. Pat. No. 3,818,577 to Bailey et al., fracture splitting is an advantageous technique from the standpoint of reducing manufacturing costs for producing machine components, such as connecting rods for inexpensive engines. But, as they also indicate, high quality connecting rods and the like, such as are utilized for diesel engines and high output gasoline engines, for example, require the use of high strength, high ductility (toughness) materials that are unsuitable for breaking without excessive distortion. For the indicated reason, Bailey et al. disclose a method for manufacturing high strength connecting rods by machining a part formed as a single piece, and then using an electron beam to create a frangible zone of very hard brittle steel along an intended parting plane. This frangible zone is created by heating the material to above the austenitic temperature of the metal and quenching it. The part can then be fractured into two pieces along the embrittled fracture line, so that a pair of parts result which have irregular mating surfaces which provide a substantial resistance to sliding between the two parts. However, the electron beam may not be capable of penetrating, and thus treating, parts having thick sections, making it difficult to obtain a thin controlled zone in the bore region. Furthermore, this process creates tool problems when finish machining the bore due to the presence of hard, brittle stripes in the otherwise ductile surface of the bore. Still further, this process requires expensive equipment and an extra processing operation, not to mention the possible need for stress relieving, all of which increase costs.

U.S. Pat. No. 3,978,566 to Ladin discloses a process for fabricating components having members of a split construction with a plurality of matched sections, where the individual components are manufactured separately, preliminarily machined, and then adhesively secured into a bonded assembly which is finish machined as a unit. After it is finish machined, the assembly is cleaved to provide a matched set of sections for the final assembly of the component. However, this technique also has several shortcomings.

Firstly, a two-stage (preliminary and finish) machining process is involved, which is then further complicated if the adhesive is to be removed prior to final assembly of the component. Furthermore, application of adhesive is an extra process step that requires careful cleaning of the joint surfaces, and yet another cleaning step if the adhesive is removed after re-separation of the parts. On the other hand, if the adhesive is not removed once the parts are re-separated, it can act as a gasket precluding the parts from being finally assembled with sufficient tightness, or the adhesive could compress or come off, in whole or part, during installation, adversely affecting tightness and tolerances, posing potential engine problems. Additionally, even if the adhesive does not compress or come off during installation, it could react with oil that is present, e.g., for a connecting rod in an engine environment, and break down as a result, again affecting tightness and tolerances. Also, since the mating surfaces are smooth, dowels or other means must be used to preclude relative movement between the parts.

Thus, there is still a need for a fracture splitting process which can be effectively utilized with materials having properties of high strength and high ductility without requiring adhesives or localized embrittlement. Furthermore, it is desirable that such be achieved in a way which produces a self-locating effect between the components to be mated, so as to eliminate the need for separate, added elements, such as dowels or the like.

SUMMARY OF THE INVENTION

In view of the foregoing, it is a primary object of the present invention to provide a method for manufacturing connecting rods for internal combustion engines, and other forged components which must be separated for reassembly around another component, which enables the advantages of fracture splitting to be obtained using higher fatigue strength materials than typical "fracturable" materials, such as the powder forgings and cast iron, conventionally used for fracture split forged components, and without using adhesives or localized embrittlement.

Another object of the present invention is to provide a connecting rod manufacturing process by which forged parts can be self-located with respect to each other and mechanically and/or metallugically bonded together prior to any machining thereof, and then, once bonded, can be machined (e.g., rough bored, and drilled and tapped for screws).

A further object of the present invention is to obtain the foregoing objects in a way that enables fracture splitting of the bonded parts and reassembling without further preparation of the mating faces.

Yet another object of the present invention is to obtain the foregoing objects, not only for parts produced by forging, but to other processes known for the production engine components, e.g., casting, powder metallurgy, casting, die casting (metal injection), etc.

These and other objects are obtained in accordance with embodiments of the present invention. In particular, the process starts by taking separate, e.g., rod and cap, parts and coining or forging them together prior to machining. The mating surfaces of the parts are formed with mating or nesting features such as a dimple-recess or ridge-groove configuration giving them a self-locating ability. After machining, the parts are fractured along the original division to obtain two uniquely matched surfaces that need no further processing before being reassembled.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
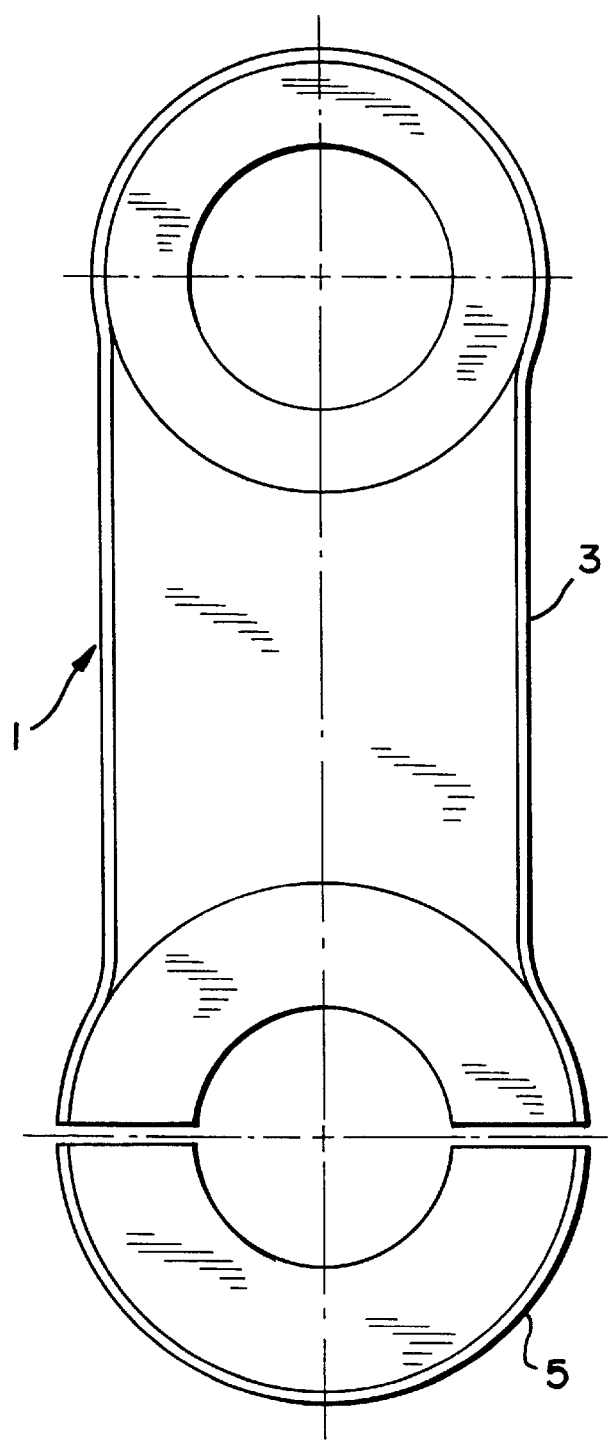
FIGS. 1 & 2 are elevational and cross-sectional views of a connecting link produced in accordance with a first embodiment of the invention.

The present invention is a method for manufacturing a component which is formed of two pieces which must be able to be separated for reassembly around another component. By way of example only, FIGS. 1 & 2 show a connecting link 1 comprised of a rod part 3 and a cap part 5, while FIGS. 3–6 show a connecting rod 1' for an internal combustion engine having rod 3' and a cap 5' for assembly about, e.g., a crank shaft (not shown).

The rod 3 and cap 5 are forged as two separate pieces made of any conventional high strength, high ductility (toughness) forging alloy known for use for connecting rods. By way of example only, the method can be performed using pieces forged from such steel alloys as 4140 and 15B41A quenched and tempered steels.

Figure 2:
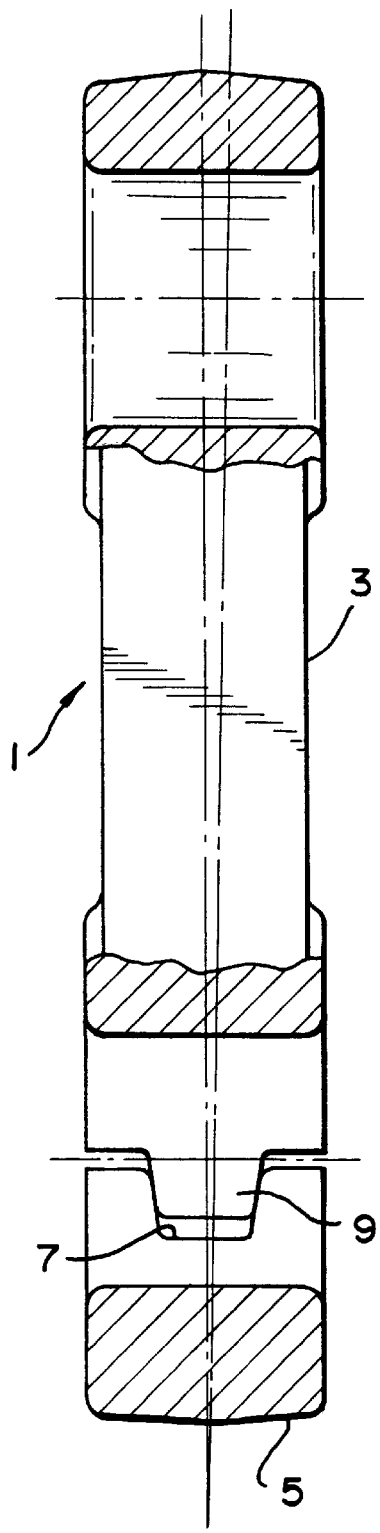
Figure 3:
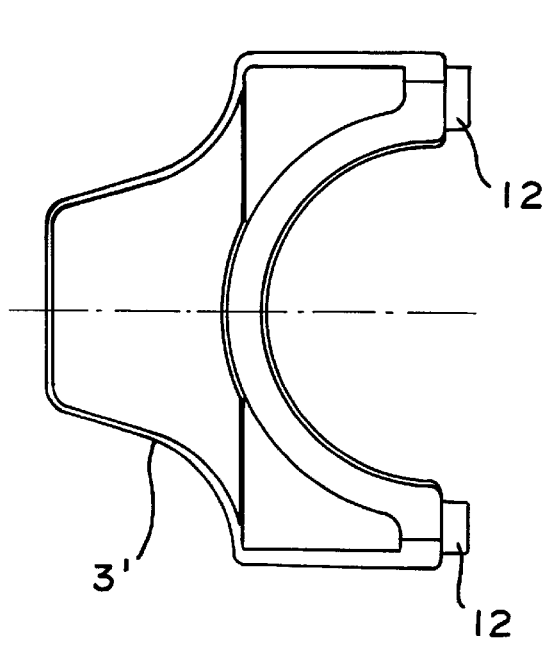
FIGS. 3 & 4 are side and end elevational views of a rod part of a connecting rod in accordance with a second embodiment of the invention.
Figure 4:
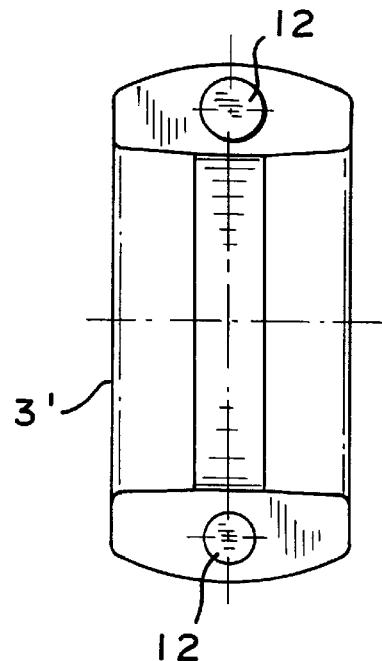
Figure 5:
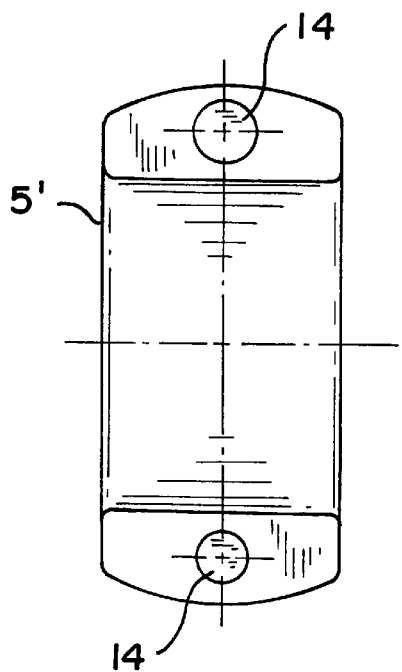
FIGS. 5 & 6 are side and end elevational views of a cap part of a connecting rod in accordance with the second embodiment of the invention.
Figure 6:
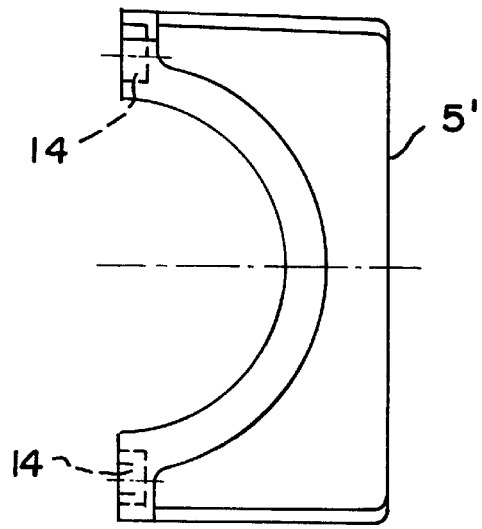

The connecting rod 1 is made by hot forging the rod 3 and cap 5 as two separate pieces, where one of the pieces has a wedge-shaped groove 7 and the other has a corresponding wedge-shaped ridge 9 to create interfitting surfaces that act to maintain the pieces in the correct alignment when assembled as shown in FIG. 2. Alternatively, as shown for the embodiment of FIGS. 3–6, one of the pieces, e.g., rod 3', can be formed with at least one dimple or lug 12 and the other, e.g., cap 3', with a corresponding dimple- or lug-shaped recess 14. Other geometries may be used which provide interlocking features that locate the two surfaces with respect to each other.

With the unmachined, forged parts 3, 5 assembled as shown in the figures (or like an assembly of parts 3', 5') by, for example, a press-fit or friction joint, the assembly is forged or cold coined to form a mechanical bond and/or a metallurgical bond between the interfit surfaces thereof. Coatings may be applied to the interfit surfaces prior to assembly and cold coining or forging in order to tailor the bond strength achieved to suitable levels. For example, Boron nitride, graphite, or molybdenum disulfide might be used to produce a weaker bond, while copper or nickel might be used to enhance the resultant bond. The parts 3, 3' and 5, 5' are then machined as a single piece, e.g., rough boring of bore 15, and drilling and tapping for tap screws used for holding parts 3, 5 together in use. After machining of the one-piece assembly, the machined assembly is fracture split along a separation line defined along the original interfit surfaces of the parts 3, 5 or 3', 5'. As a result, the original ridge-groove or the dimple/lug-recess combination and the surface asperities produced by the fracturing process enable accurate positioning of the parts 3, 5 or 3', 5' when they are reassembled for installation.

This method dispenses with the need for dowel pins to prevent movement of the assembly, and does not require expensive machining of the contact faces to achieve a proper match of the joint, either preliminary to temporary bonding of the forged parts or subsequent to the fracture splitting of the bonded parts. The advantages of fracture splitting are obtained using higher fatigue strength materials than typical "fracturable" materials, such as the powder forgings and cast iron, conventionally used for fracture split forged components, and without using adhesives or localized embrittlement.

While various embodiments in accordance with the present invention have been shown and described, it is understood that the invention is not limited thereto, and is susceptible to numerous changes and modifications as known to those skilled in the art. For example, while the invention has been described with respect to the production of a connecting rod for an internal combustion engine and is particularly advantageous in that context, it will be applicable to the production of a wide range of other parts which must be separated for reassembly around another component, such as journal boxes, bearing shells, etc. Likewise, while the above embodiments have been described with regard to the use of forged parts, the present invention has been found to be applicable parts for the indicated types of components which have been produced by any known process and material suitable for producing such parts. That is, the rod and cap shaped parts, could be produced by casting, powder metallurgy (pressing/sintering), die casting (metal injection molding), and using manufacturing processes to tailor each part's properties depending on structure requirements, such as by controlling grain flow, microstructure and the shape of sulfide inclusions, etc., and in addition to the materials described above, other materials such as titanium, metal matrix composites as well other ferrous materials. Furthermore, the each of the two parts can be produced by a different method and/or material than the other, e.g., one of the parts can be manufactured from investment cast steel to provide high integrity at an economic cost, while the other could be forged or made by powder metallurgy processing, without requiring any changes to the inventive bonding, machining and fracturing steps as set forth above. Therefore, this invention is not limited to the details shown and described herein, and includes all such changes and modifications as are encompassed by the scope of the appended claims.

Industrial Applicability

The present invention will find a wide range of applicability for the production of components, such as connecting rods for internal combustion engines, journal boxes, bearing shells, etc., which must be separated for reassembly around another component. In particular, this invention will be especially advantageous in the production of such components which must be made of high strength, high ductility metals which are not suitable for fracture splitting via conventional techniques.

We claim:

1. A method of manufacturing a component formed of parts capable of being separated for reassembly around another component comprising the steps of:

A) manufacturing a pair of separate parts;

B) bonding the two parts together along interfitting surfaces thereof to form a single part via at least one of mechanical and metallurgical means;

C) machining the resulting single part; and

D) fracturing the single part along a parting line extending along the original interfitting surfaces so as to obtain a pair of parts having two matched surfaces that need no further processing before being reassembled.

2. A method of manufacturing according to claim 1, wherein said separate parts are made of a high strength, high ductility alloy.

3. A method of manufacturing according to claim 2, wherein said intermitting surfaces comprise a ridge having a wedge-shaped cross section formed on one of said parts and a groove having a wedge-shaped cross section formed on the other of said parts.

4. A method of manufacturing according to claim 2, wherein said interfitting surfaces comprise at least one lug formed on one of said parts and a lug-shaped recess formed on the other of said parts.

5. A method of manufacturing according to claim 2, wherein said bonding step is performed by one of forging and cold coining.

6. A method of manufacturing according to claim 5, wherein said interfitting surfaces comprise a ridge having a wedge-shaped cross section formed on one of said parts and a groove having a wedge-shaped cross section formed on the other of said parts.

7. A method of manufacturing according to claim 5, wherein said interfitting surfaces comprise at least one lug formed on one of said parts and a lug-shaped recess formed on the other of said parts.

8. A method of manufacturing according to claim 1, wherein said component is a connecting rod and said pair of parts are a rod part and a cap part which, when assembled together, define a bore having a center lying on said parting line.

9. A method of manufacturing according to claim 8, wherein said separate parts are made of high strength, high ductility alloy.

10. A method of manufacturing according to claim 9, wherein said interfitting surfaces comprise a ridge having a wedge-shaped cross section formed on one of said parts and a groove having a wedge-shaped cross section formed on the other of said parts.

11. A method of manufacturing according to claim 9, wherein said interfitting surfaces comprise at least one lug formed on one of said parts and a lug-shaped recess formed on the other of said parts.

12. A method of manufacturing according to claim 9, wherein said bonding step is performed by one of forging and cold coining.

13. A method of manufacturing according to claim 12, wherein said interfitting surfaces comprise a ridge having a wedge-shaped cross section formed on one of said parts and a groove having a wedge-shaped cross section formed on the other of said parts.

14. A method of manufacturing according to claim 12, wherein said interfitting surfaces comprise at least one lug formed on one of said parts and a lug-shaped recess formed on the other of said parts.

15. A method of manufacturing according to claim 1, wherein step B is performed on the parts produced in step A without preliminary machining thereof.

16. A method of manufacturing according to claim 15, wherein said separate parts are made of high strength alloy, high ductility alloy.

17. A method of manufacturing according to claim 16, wherein said interfitting surfaces comprise a ridge having a wedge-shaped cross section formed on one of said parts and a groove having a wedge-shaped cross section formed on the other of said parts.

18. A method of manufacturing according to claim 16, wherein said interfitting surfaces comprise at least one lug formed on one of said parts and a lug-shaped recess formed on the other of said parts.

19. A method of manufacturing according to claim 16, wherein said bonding step is performed by one of forging and cold coining.

20. A method of manufacturing according to claim 16, wherein said component is a connecting rod and said pair of parts are a rod part and a cap part which, when assembled together, define a bore having a center lying on said parting line.

21. A method of manufacturing according to claim 1, wherein at least one of said pair of separate parts is manufactured by forging.

22. A method of manufacturing according to claim 21, wherein the other of said pair of separate parts is manufactured by a process other than forging.

23. A method of manufacturing according to claim 21, wherein said separate parts are manufactured of different materials.

24. A method of manufacturing according to claim 1, wherein at least one of said pair of separate parts is manufactured by a casting process.

25. A method of manufacturing according to claim 24, wherein the other of said pair of separate parts is manufactured by a process other than a casting process.

26. A method of manufacturing according to claim 24, wherein said separate parts are manufactured of different materials.

27. A method of manufacturing according to claim 1, wherein at least one of said pair of separate parts is manufactured by a powder metallurgy process.

28. A method of manufacturing according to claim 27, wherein the other of said pair of separate parts is manufactured by a process other than a powder metallurgy process.

29. A method of manufacturing according to claim 27, wherein said separate parts are manufactured of different materials.

30. A method of manufacturing according to claim 1, wherein one of said separate parts is manufactured by a different processes than the other.

31. A method of manufacturing according to claim 1, wherein one of said separate parts is manufactured of a different material than the other.

\* \* \* \* \*